(12) United States Patent
Kobayashi

(10) Patent No.: US 8,954,483 B2
(45) Date of Patent: Feb. 10, 2015

(54) ARITHMETIC CIRCUIT AND ARITHMETIC APPARATUS

(75) Inventor: Yuki Kobayashi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 251 days.

(21) Appl. No.: 13/546,683

(22) Filed: Jul. 11, 2012

(65) Prior Publication Data

US 2013/0041929 A1 Feb. 14, 2013

(30) Foreign Application Priority Data

Aug. 10, 2011 (JP) ................................. 2011-174849

(51) Int. Cl.
*G06F 7/00* (2006.01)
*G06F 7/02* (2006.01)

(52) U.S. Cl.
CPC ..................................... *G06F 7/026* (2013.01)
USPC ......................................................... 708/207

(58) Field of Classification Search
CPC ....... G06F 9/30021; G06F 7/544; G06F 7/22; G06F 7/026; G06F 9/3001
USPC ....................................................... 708/207
See application file for complete search history.

(56) References Cited

U.S. PATENT DOCUMENTS

| | | | |
|---|---|---|---|
| 5,944,771 A * | 8/1999 | Shiraishi | 708/671 |
| 5,991,785 A * | 11/1999 | Alidina et al. | 708/207 |
| 6,904,510 B1 | 6/2005 | Sijstermans | |
| 7,500,089 B2 * | 3/2009 | Iwanaga | 708/207 |
| 2001/0039538 A1 * | 11/2001 | Pappalardo et al. | 706/1 |

FOREIGN PATENT DOCUMENTS

| | | |
|---|---|---|
| JP | 60-104942 U | 7/1985 |
| JP | 2-186436 A | 7/1990 |
| JP | 2000-163384 A | 6/2000 |
| JP | 2002-527812 A | 8/2002 |
| JP | 2004-62401 A | 2/2004 |
| JP | 2009-175861 A | 8/2009 |
| JP | 2010-97356 A | 4/2010 |

* cited by examiner

*Primary Examiner* — Tan V. Mai
(74) *Attorney, Agent, or Firm* — Foley & Lardner LLP

(57) ABSTRACT

Provided are an arithmetic circuit and an arithmetic apparatus capable of performing comparison involving conditional branch of three or more values at high speed. The arithmetic circuit includes a plurality of computing units, a plurality of selection circuits and a decision unit. The plurality of computing units perform arithmetic computations on input data and output flag information generated based on a result of the computations. The plurality of selection circuits select any one of the data input to the plurality of computing units. The decision unit receives the flag information from the plurality of computing units and controls select operation of each of the plurality of selection circuits.

15 Claims, 12 Drawing Sheets

| idx | e0 | e1 | e2 | e3 | e4 | e5 | e6 | e7 | e8 | e9 |
|---|---|---|---|---|---|---|---|---|---|---|
| 0 | d01 | d02 | d03 | d11 | d12 | d13 | d21 | d22 | d23 | |
| 1 | d31 | d32 | d33 | d41 | d42 | d43 | d51 | d52 | d53 | |
| 2 | d61 | d62 | d63 | | | | | | | |

Fig. 6

| MAGNITUDE RELATION | | | | SIGN FLAG | | | CONTROL SIGNAL | | | |
|---|---|---|---|---|---|---|---|---|---|---|
| D0<D1 | D1<D2 | D2<D0 | ORDER | F1 | F2 | F3 | CON1 | CON2 | CON3 | CON4 |
| FALSE | FALSE | FALSE | D0=D1=D2 | 0 | 0 | 0 | 0 | 2 | 1 | 0 |
| FALSE | FALSE | TRUE | D0≧D1≧D2 | 0 | 0 | 1 | 0 | 2 | 1 | 0 |
| FALSE | TRUE | FALSE | D2≧D0≧D1 | 0 | 1 | 0 | 2 | 1 | 0 | 2 |
| FALSE | TRUE | TRUE | D0≧D2≧D1 | 0 | 1 | 1 | 0 | 1 | 1 | 0 |
| TRUE | FALSE | FALSE | D1≧D2≧D0 | 1 | 0 | 0 | 1 | 0 | 2 | 1 |
| TRUE | FALSE | TRUE | D1≧D0≧D2 | 1 | 0 | 1 | 1 | 2 | 2 | 1 |
| TRUE | TRUE | FALSE | D2≧D1≧D0 | 1 | 1 | 0 | 2 | 0 | 0 | 2 |
| TRUE | TRUE | TRUE | N/A | 1 | 1 | 1 | N/A | N/A | N/A | N/A |

Fig. 12

ARITHMETIC CIRCUIT AND ARITHMETIC APPARATUS

CROSS-REFERENCE TO RELATED APPLICATIONS

This application is based upon and claims the benefit of priority from Japanese patent application No. 2011-174849, filed on Aug. 10, 2011, the disclosure of which is incorporated herein in its entirety by reference.

BACKGROUND

The present invention relates to an arithmetic circuit and an arithmetic apparatus and, particularly, to an arithmetic circuit and an arithmetic apparatus that perform parallel processing.

Generally, the color space is used as a means of representing color information of pixels that form an image. In the case of displaying images on a display or the like, the RGB System that represents Red-Green-Blue additive color mixing is widely used. On the other hand, in the case of selecting a foreground color for drawing illustrations or the like on a computer, the HSV System is often used for the reason that it offers familiarity with the sense of humans, being users. The HSV System represents color information using three elements of Hue, Saturation and Value.

To handle the color information represented in the RGB System (which is referred to hereinafter as RGB color space) and the color information represented in the HSV System (hereinafter as HSV color space), conversion between two systems is required. The conversion is performed by an image processor or the like. In a general instruction-set processor such as an image processor, 2-input 1-output instructions are often used. Further, to enhance the processing performance, a processor using VLIW (Very Long Instruction Word) architecture is also proposed.

In the case of conversion from the RGB color space to the HSV color space, Hue (H), Saturation (S) and Value (V) are represented as follows. Note that the minimum of Red (R), Green (G) and Blue (B) is 0, and the maximum is 1.

The formula for computation of Hue (H) differs depending on which of R, G and B is the maximum. First, when the value of R is the maximum among R, G and B, Hue (H) is represented by the following equation (1). MAX indicates the value of R, which is the maximum value. MIN indicates the minimum value among R, G and B, which is the smaller value of G and B.

Equation (1):
$$H = 60 \times \frac{G-B}{MAX - MIN} + 0 \qquad (1)$$

When the value of G is the maximum among R, G and B, Hue (H) is represented by the following equation (2). MAX indicates the value of G, which is the maximum value. MIN indicates the minimum value among R, G and B, which is the smaller value of R and B.

Equation (2):
$$H = 60 \times \frac{B-R}{MAX - MIN} + 120 \qquad (2)$$

When the value of B is the maximum among R, G and B, Hue (H) is represented by the following equation (3). MAX indicates the value of B, which is the maximum value. MIN indicates the minimum value among R, G and B, which is the smaller value of R and G.

Equation (3):
$$H = 60 \times \frac{R-G}{MAX - MIN} + 240 \qquad (3)$$

Saturation (S) is represented by the following equation (4).

Equation (4):
$$S = \frac{MAX - MIN}{MAX} \qquad (4)$$

Value (V) is represented by the following equation (5).
Equation (5):

$$V = MAX \qquad (5)$$

As shown in the above equations (1) to (5), in the conversion from the RGB color space to the HSV color space, conditional branch to compare three values of R, G and B and operation to obtain the maximum value MAX and the minimum value MIN of R, G and B are required when calculating Hue (H). Further, it is also required to obtain a difference between two values other than the maximum value MAX (the numerator of the fraction in the first term of the right hand side of the equations (1) to (3)).

As an arithmetic processor to perform the conditional branch and calculate the maximum value and the minimum value, a VLIW processor is known, for example. Various other processors are also proposed.

For example, a technique of performing a process that involves conditional branch at high speed by executing parallel processing with a plurality of processor elements is proposed (Japanese Unexamined Patent Application Publication No. 2004-62401). This technique achieves a process involving conditional branch and calculation of the maximum value and the minimum value by selecting outputs of the processor elements using selectors.

Further, a technique of giving an instruction for a multifunctional unit (processor) to two or more issue slots in many instruction cycles in order to make good use of register file read ports is proposed (Japanese Unexamined Patent Application Publication (Translation of PCT Application) No. 2002-527812). This allows, even in the cycle where the multifunctional unit is not used, other functional units to use the issue slots, thereby achieving efficient use of the read ports.

Further, an architecture capable of handling the case where an address to be accessed varies depending on processing (i.e. conditional branch) (Japanese Unexamined Patent Application Publication No. 2010-97356) and a technique to efficiently and quickly detect a processor having the maximum value or the minimum value among compared data (Japanese Unexamined Patent Application Publication No. 2000-163384) are proposed.

SUMMARY

However, the present inventor has found that the above techniques have the following problems. In the conversion from the RGB color space to the HSV color space, it is generally necessary to calculate the maximum value and the minimum value of three values of R, G and B and a difference between two values other than the maximum value. For example, to calculate the maximum value of three values r1 to r3, two cycles are required as shown in the following instructions.

First Cycle: max r1, r2, r4
Second Cycle: max r4, r3, r4

In the first cycle, the maximum value of the two values r1 and r2 is stored in the value r4. In the second cycle, the maximum value of the two values r3 and r4 is stored in the value r4. Specifically, the value r4 is temporarily stored in the register file after executing the first cycle, and then the stored value r4 is referred to in the second cycle. This is the same in the case of calculating the minimum value. Further, because the maximum value of R, G and B needs to be known before performing calculation by the above equations (1) to (3), it is necessary to calculate the maximum value in advance.

Stated differently, in the above-described techniques, it is necessary to repeatedly perform comparison of two values in order to determine a magnitude relation among three or more values, and the comparison result needs to be stored in a storage means such as a register file each time the comparison is made. Thus, in general techniques, a plurality of cycles are required to perform comparison of three or more values, which hinders the speed-up of the processing. Accordingly, the speed-up of the conversion from the RGB color space to the HSV color space that involves comparison of three values of R, G and B is hindered.

One aspect of the present invention is an arithmetic circuit that includes a plurality of computing units that perform arithmetic computations on input data and output flag information generated based on a result of the computations, a plurality of selection circuits that select any one of the data input to the plurality of computing units, and a decision unit that receives the flag information from the plurality of computing units and controls select operation of each of the plurality of selection circuits. In this arithmetic circuit, the select operation of the selection circuits may be controlled based on a magnitude relation of the data input to the computing units, so that the selection circuits select a maximum value, a minimum value and a difference of values other than the maximum value. It is thereby possible to calculate the maximum value, the minimum value and the difference of values other than the maximum value in a single cycle without storing data into a register in the process of the computations.

According to the aspect of the present invention, it is possible to provide an arithmetic circuit and an arithmetic apparatus that can perform comparison involving conditional branch of three or more values at high speed.

BRIEF DESCRIPTION OF THE DRAWINGS

The above and other aspects, advantages and features will be more apparent from the following description of certain embodiments taken in conjunction with the accompanying drawings, in which:

FIG. 6 is a diagram showing a relation between the value val of the decision information setting instruction SET and the set values of the decision table 41;

FIG. 12 is a diagram showing a decision table 44 stored in a decision unit 43.

DETAILED DESCRIPTION

Figure 1:
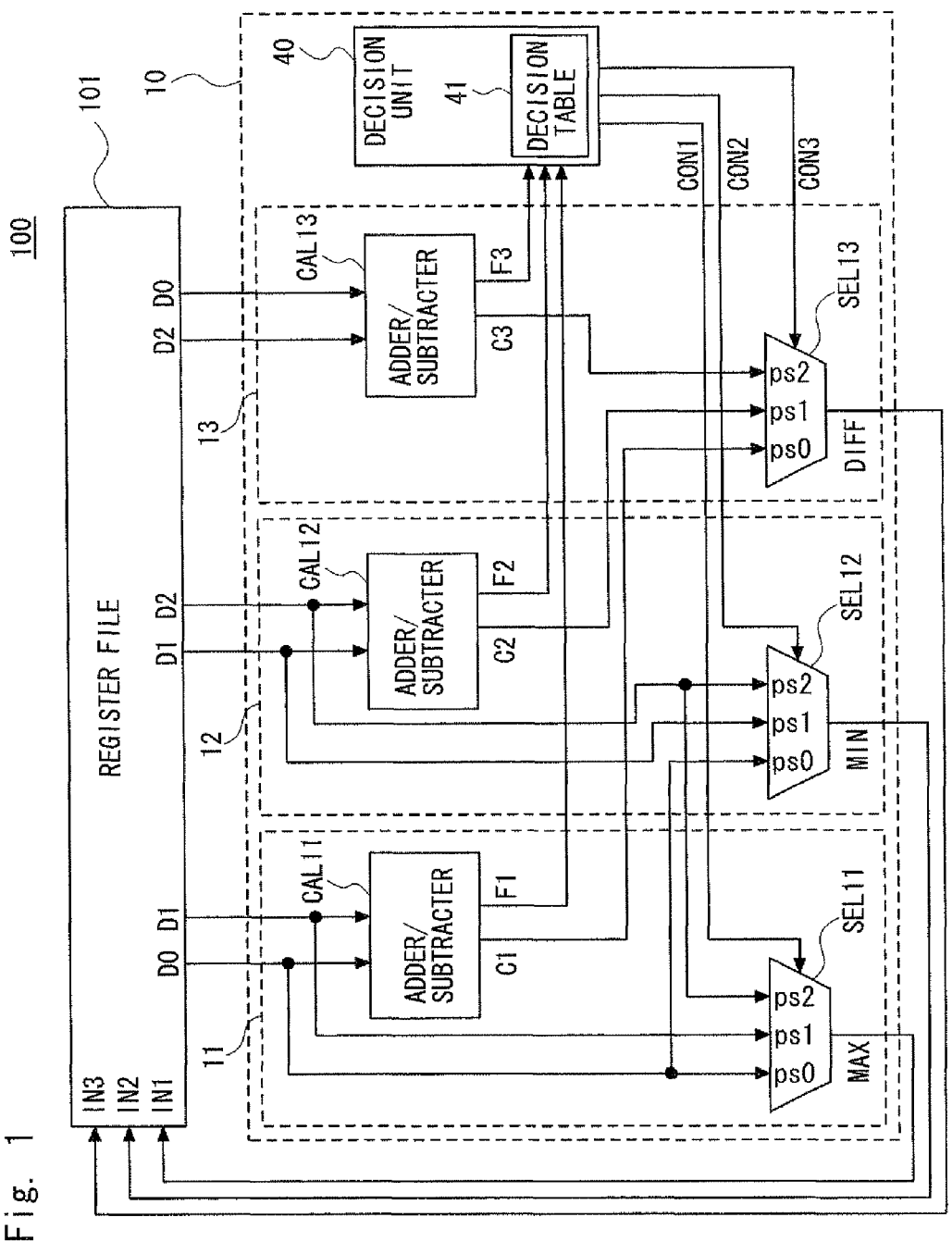
FIG. 1 is a block diagram schematically showing a configuration of an arithmetic apparatus 100 according to a first embodiment.

Embodiments of the present invention are described hereinafter with reference to the drawings. In the drawings, the same elements are denoted by the same reference symbols, and the redundant explanation is omitted as appropriate.

First Embodiment

An arithmetic apparatus 100 according to a first embodiment is described hereinbelow. FIG. 1 is a block diagram schematically showing a configuration of the arithmetic apparatus 100 according to the first embodiment. The arithmetic apparatus 100 includes a register file 101 and an arithmetic circuit 10.

The register file 101 stores data to be used for computations of the arithmetic circuit 10 or data calculated by computations of the arithmetic circuit 10. As shown in FIG. 1, the register file 101 is provided with ports IN1 to IN3 through which data are input. Further, the register file 101 outputs data D0 to D2 to the arithmetic circuit 10. Note that the data D0 to D2 correspond to first to third data, respectively. The register file 101 may have other ports or output other data, and which port to be used or which data to be output can be designated by an instruction from an external control circuit (not shown), for example.

The arithmetic circuit 10 includes a plurality of slots 11 to 13 and a decision unit 40. The slots 11 to 13 include adders/subtracters CAL11 to CAL13 and selectors SEL11 to SEL13, respectively. The adder/subtracter is one example of a computing unit, and the adders/subtracters CAL11 to CAL13 correspond to first to third computing units, respectively. The selectors SEL11 to SEL13 are 3-input 1-output selectors. The selector is one example of a selection circuit, and the selectors SEL11 to SEL13 correspond to first to third selection circuits, respectively.

In the slot 11, the data D0 and D1 are input to the adder/subtracter CAL11 from the register file 101. The adder/subtracter CAL11 then outputs a computation result C1 to the selector SEL13. Further, the adder/subtracter CAL11 outputs a sign flag F1 to the decision unit 40. The data D0 to D2 are respectively input from the register file 101 to input ports ps0 to ps2 of the selector SEL11. The selector SEL11 then outputs any one of the data D0 to D2 as a maximum value MAX to the port IN1 of the register file 101 based on a control signal CON1 from the decision unit 40.

In the slot 12, the data D1 and D2 are input to the adder/subtracter CAL12 from the register file 101. The adder/subtracter CAL12 then outputs a computation result C2 to the selector SEL13. Further, the adder/subtracter CAL12 outputs a sign flag F2 to the decision unit 40. The data D0 to D2 are respectively input from the register file 101 to input ports ps0 to ps2 of the selector SEL12. The selector SEL12 then outputs any one of the data D0 to D2 as a minimum value MIN to the port IN2 of the register file 101 based on a control signal CON2 from the decision unit 40.

In the slot 13, the data D2 and D0 are input to the adder/subtracter CAL13 from the register file 101. The adder/subtracter CAL13 then outputs a computation result C3 to the selector SEL13. Further, the adder/subtracter CAL13 outputs a sign flag F3 to the decision unit 40. The computation results C1 to C3 of the adders/subtracters CAL11 to CAL13 are respectively input to input ports ps0 to ps2 of the selector SEL13. The selector SEL13 then outputs any one of the computation results C1 to C3 as a difference DIFF to the port IN3 of the register file 101 based on a control signal CON3 from the decision unit 40.

Note that the sign flag is flag information that is output according to the computation result of the adder/subtracter, and the sign flags F1 to F3 correspond to first to third sign flags, respectively.

The decision unit 40 outputs the control signals CON1 to CON3 to the selectors SEL11 to SEL13, respectively, by reference to a stored decision table 41 on the basis of the sign flags F1 to F3. The decision table 41 correspond to a first decision table.

An operation of the arithmetic apparatus 100 is described hereinbelow. In the arithmetic apparatus 100, the arithmetic circuit 10 reads the data D0 to D2 from the register file 101. The arithmetic circuit 10 then detects the maximum value MAX and the minimum value MIN of the data D0 to D2 and the difference DIFF between two values other than the maximum value MAX. Then, the arithmetic circuit 10 outputs the maximum value MAX, the minimum value MIN, and the difference DIFF between two values other than the maximum value MAX to the register file 101. Replacement of the data D0 to D2 with R, G and B in the RGB color space allows the arithmetic apparatus 100 to perform the conversion from the RGB color space to the HSV color space (which is referred to hereinafter as HSV conversion) using the above-described equations (1) to (5). The HSV conversion of the arithmetic apparatus 100 is specifically described hereinafter.

In the slot 11, the adder/subtracter CAL11 subtracts the value of the data D1 from the value of the data D0 and outputs the subtraction result as the computation result C1. Further, the adder/subtracter CAL11 outputs the sign flag F1 according to the subtraction result. Specifically, when the sign of the computation result C1 is negative, i.e. D0<D1, the adder/subtracter CAL11 outputs "1" as the sign flag F1. On the other hand, when the sign of the computation result C1 is not negative, i.e. D0≥D1, the adder/subtracter CAL11 outputs "0" as the sign flag F1.

Likewise, in the slot 12, the adder/subtracter CAL12 subtracts the value of the data D2 from the value of the data D1 and outputs the subtraction result as the computation result C2. Further, the adder/subtracter CAL12 outputs the sign flag F2 according to the subtraction result. Specifically, when the sign of the computation result C2 is negative, i.e. D1<D2, the adder/subtracter CAL12 outputs "1" as the sign flag F2. On the other hand, when the sign of the computation result C2 is not negative, i.e. D1≥D2, the adder/subtracter CAL12 outputs "0" as the sign flag F2.

Likewise, in the slot 13, the adder/subtracter CAL13 subtracts the value of the data D0 from the value of the data D2 and outputs the subtraction result as the computation result C3. Further, the adder/subtracter CAL13 outputs the sign flag F3 according to the subtraction result. Specifically, when the sign of the computation result C3 is negative, i.e. D2<D0, the adder/subtracter CAL13 outputs "1" as the sign flag F3. On the other hand, when the sign of the computation result C3 is not negative, i.e. D2≥D0, the adder/subtracter CAL13 outputs "0" as the sign flag F3.

Figure 2:
FIG. 2 is a diagram showing a decision table 41 stored in a decision unit 40.

The decision unit 40 determines a magnitude relation among the data D0 to D2 according to the sign flags F1 to F3. The decision unit 40 then outputs the control signals CON1 to CON3 on the basis of the magnitude relation of the data D0 to D2. FIG. 2 is a diagram showing a decision table 41 that is stored in the decision unit 40.

For example, when the sign flags F1 to F3 are "0", "0" and "1", respectively, the propositions "D0<D1" and "D1<D2" are false, and the proposition "D2<D0" is true. In this case, the magnitude relation "D0≥D1≥D2" is established for the data D0 to D2. In this case, the decision unit 40 outputs "0", "2" and "1" as the control signals CON1 to CON3, respectively. Each of the selectors SEL11 to SEL13 selects any one of the input ports ps0 to ps2 according to the control signals CON1 to CON3. Specifically, when the value of the control signals CON1 to CON3 is k (k is an integer of 0 to 2), each of the selectors SEL11 to SEL13 selects an input port psk.

The selector SEL11 selects the data D0 that is input to the input port ps0 according to the value "0" of the control signal CON1. The data D0 is thereby specified as the maximum value MAX. Thus, the selector SEL11 functions as a maximum value selector. Then, the selector SEL11 outputs the data D0, which is the maximum value MAX, to the port IN1 of the register file 101. Accordingly, the port IN1 of the register file 101 always receives the maximum value MAX.

The selector SEL12 selects the data D2 that is input to the input port ps2 according to the value "2" of the control signal CON2. The data D2 is thereby specified as the minimum value MIN. Thus, the selector SEL12 functions as a minimum value selector. Then, the selector SEL12 outputs the data D2, which is the minimum value MIN, to the port IN2 of the register file 101. Accordingly, the port IN2 of the register file 101 always receives the minimum value MIN.

The selector SEL13 selects the computation result C2 that is input to the input port ps1 according to the value "1" of the control signal CON3. The computation result C2, i.e. (D1−D2), is thereby specified as the difference DIFF excluding the maximum value MAX (D0). In other words, the selector SEL13 selects the computation result C2 of the adder/subtracter CAL12 to which the maximum value MAX (D0) is not input as the difference DIFF according to the control signal CON3. Thus, the selector SEL13 functions as a difference selector. Then, the selector SEL13 outputs the computation result C2, which is the difference DIFF, to the port IN3 of the register file 101. Accordingly, the port IN3 of the register file 101 always receives the difference DIFF.

Although the case where the sign flags F1 to F3 are "0", "0" and "1", respectively, is described above by way of illustration, the selectors SEL11 to SEL13 output the maximum value MAX, the minimum value MIN and the difference DIFF, respectively, when the sign flags F1 to F3 are other values as a matter of course.

It is noted that, in the case of converting the RGB color space to the HSV color space using the arithmetic apparatus 100, an instruction given to the arithmetic apparatus 100 is represented by the following statement using C language, for example. Statement representing the HSV conversion:

```
vmax=(d0>d1)?((d0>d2)?d0:d2):((d1>d2)?d1:d2);
vmin=(d0<d1)?((d0<d2)?d0:d2):((d1<d2)?d1:d2);
if (vmax==d0){
Vdiff=d1−d2;
}else if (vmax==d1){
Vdiff=d2−d0;
}else{
Vdiff=d0−d1;
```

In the above statement, vmax corresponds to the maximum value MAX, vmin corresponds to the minimum value MIN, vdiff corresponds to the difference DIFF, and d0 to d2 correspond to the data D0 to D2, respectively. In the first statement, calculate the maximum value vmax of d0 to d2 using a conditional operator. In the second statement, calculate the minimum value vmin of d0 to d2 using a conditional operator. In the third and subsequent statements, calculate the difference vdiff depending on which of d0 to d2 is the maximum value using if statement.

As described above, the arithmetic circuit 10 detects the maximum value MAX, the minimum value MIN and the difference DIFF between two values other than the maximum value MAX on the basis of the decision result of the decision unit 40. Then, the arithmetic circuit 10 can output the maximum value MAX, the minimum value MIN and the difference DIFF between two values other than the maximum value MAX to the corresponding ports IN1 to IN3 of the register file 101. Thus, the arithmetic circuit 10 can calculate the maximum value MAX and the minimum value MIN in one cycle without temporarily storing the intermediate computation result into the register file 101 after reading data from the register file 101. In other words, the arithmetic circuit 10 can perform computations that involve conditional branch to compare three or more values and specify the maximum value, the minimum value and the like of the values in one cycle. Therefore, faster calculation is possible compared with the case of calculating the maximum value MAX and the minimum value MIN of three or more values in a plurality of cycles. Consequently, in this configuration, it is possible to achieve the arithmetic circuit and the arithmetic apparatus that can perform comparison involving conditional branch of three or more values at high speed.

Further, in the conversion from the RGB color space to the HSV color space, which of the equations (1) to (3) is to be used is determined depending on which value of R, G and B is the maximum. Therefore, case analysis using a conditional branch instruction is required. Thus, with use of a general arithmetic apparatus, conditional branch is required, which hinders the speed-up of the conversion from the RGB color space to the HSV color space. On the other hand, the decision unit 40 can determine which of the data D0 to D2 is the maximum value by referring to the sign flags F1 to F3 and thereby find which of the equations (1) to (3) is to be used. Consequently, in this configuration, it is possible to achieve the arithmetic circuit and the arithmetic apparatus that can perform conditional branch at high speed in the conversion from the RGB color space to the HSV color space.

Further, in this configuration, it is possible to find which of the equations (1) to (3) is to be used as described above. Thus, by controlling the selector CAL13 by the decision unit 40, the appropriate difference DIFF can be obtained in one cycle when any equation is used in the conversion from the RGB color space to the HSV color space. Accordingly, the arithmetic apparatus 100 and the arithmetic circuit 10 can perform the conversion from the RGB color space to the HSV color space at high speed and efficiently.

Figure 3:
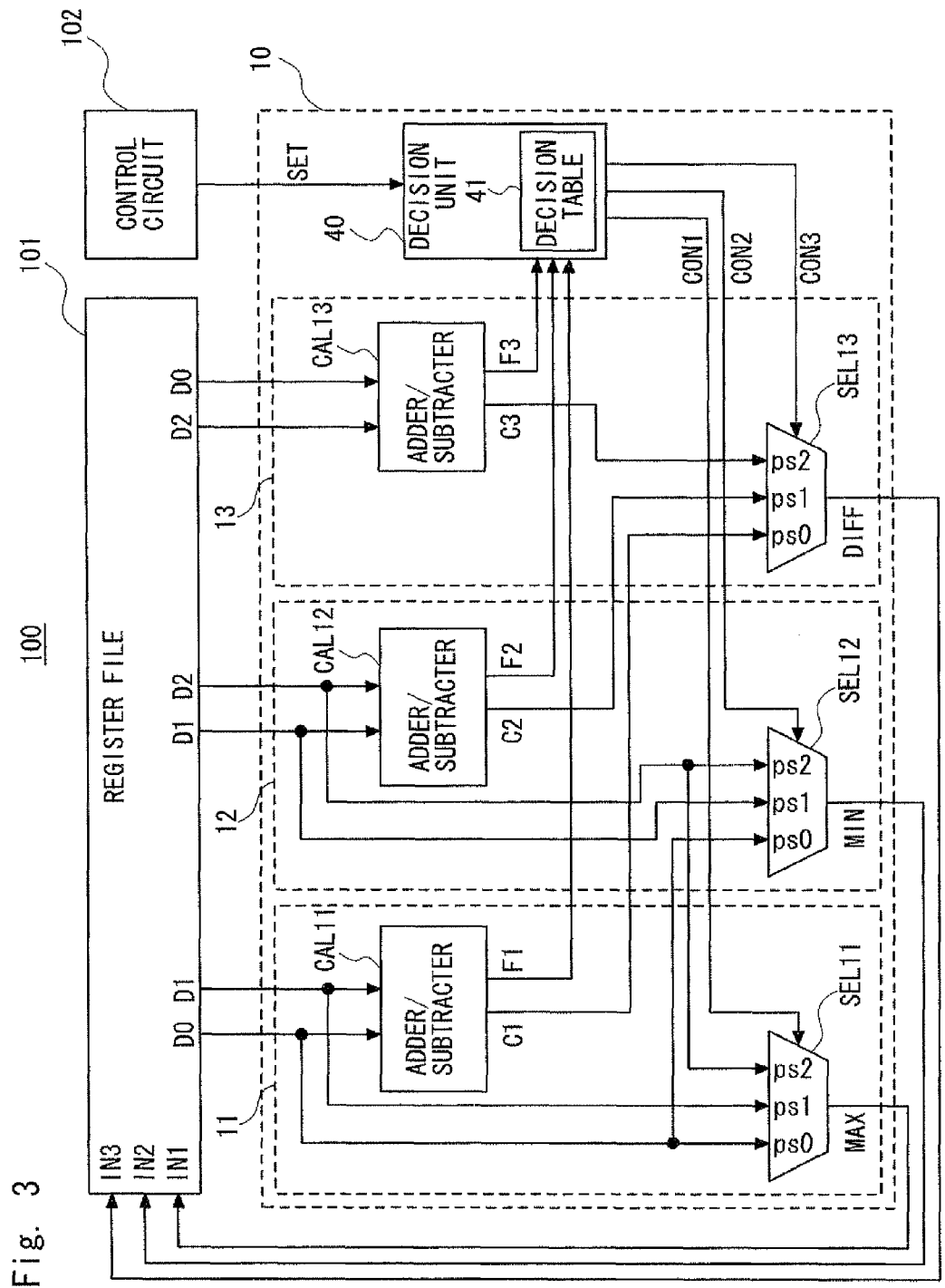
FIG. 3 is a block diagram schematically showing a configuration of the arithmetic apparatus 100 when setting the decision table 41 externally.

In the above example, the decision table 41 is prestored in the decision unit 40. However, the contents of the decision table 41 may be set by giving an external instruction. A method of setting the decision table 41 by an external instruction is described hereinafter. FIG. 3 is a block diagram schematically showing a configuration of the arithmetic apparatus 100 when setting the decision table 41 externally.

Figure 4:
FIG. 4 is a diagram showing set values of the decision table 41.

A decision information setting instruction SET is given to the decision unit 40 from a control circuit 102 outside the arithmetic apparatus 100. The decision information setting instruction SET is an instruction having the information content of 32 bits, and it is an instruction to set the values of the control signals CON1 to CON3 contained in the decision table 41. FIG. 4 is a diagram showing set values of the decision table 41. As shown in FIG. 4, set values d01 to d03, d11 to d13, d21 to d23, d31 to d33, d41 to d43, d51 to d53, d61 to d63 and d71 to d73 are assigned to the control signals CON1 to CON3. However, because in no case the propositions D0<D1, D1<D2 and D2<D0 are all true, it is only necessary to set values to the set values d01 to d03, d11 to d13, d21 to d23, d31 to d33, d41 to d43, d51 to d53 and d61 to d63 in practice.

The information content of 3 bits is allocated to each of the set values. Accordingly, ten set values can be set at a time by the 32-bit decision information setting instruction SET. Thus, by giving the 32-bit decision information setting instruction SET three times, specific values can be set to the set values d01 to d03, d11 to d13, d21 to d23, d31 to d33, d41 to d43, d51 to d53 and d61 to d63 of the decision table 41. In this case, the decision information setting instruction SET can be represented by the following statement. Statement representing the decision information setting instruction SET:

setfusion idx, val idx indicates the order of the decision information setting instruction SET, and when the decision information setting instruction SET is given three times, any of 0 to 2 is assigned. The value val indicates values assigned to the set values d01 to d03, d11 to d13, d21 to d23, d31 to d33, d41 to d43, d51 to d53 and d61 to d63. In the following example, the value val is represented by 32-bit immediate value.

Figure 5:
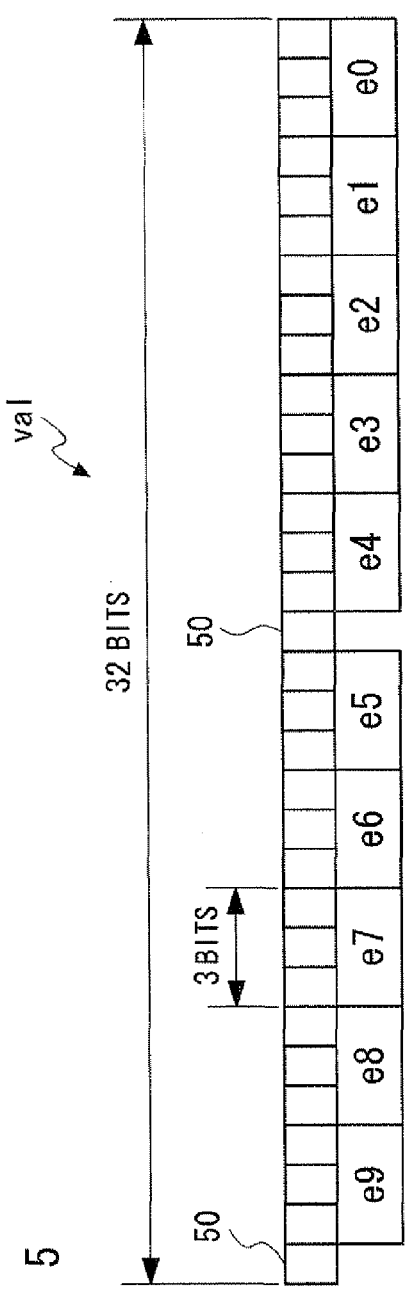
FIG. 5 is a diagram showing a structure example of a value val of decision information setting instruction SET according to the first embodiment.

FIG. 5 is a diagram showing a structure example of the value val of the decision information setting instruction SET according to the first embodiment. The value val of the decision information setting instruction SET is composed of two free bits 50 and values e0 to e9 of 3 bits each, for example. FIG. 6 is a diagram showing a relation between the value val of the decision information setting instruction SET and the set values of the decision table 41. The case of setting the values shown in FIG. 2 as the control signals CON1 to CON3 is discussed, for example.

First, in the case of idx=0, the values e0 to e9 are "0", "2", "1", "0", "2", "1", "2", "1", "0" and "0", respectively. Accordingly, the value val of the decision information setting instruction SET is the value shown in FIG. 5 in binary form. Conversion of this value into 32-bit immediate value expressed in hexadecimal form results in "0x00512050". In the case of idx=1, the values e0 to e9 are "0", "1", "1", "1", "0", "2", "1", "2", "2" and "0", respectively. Accordingly, the value val of the decision information setting instruction SET is the value shown in FIG. 5 in binary form. Conversion of this value into 32-bit immediate value expressed in hexadecimal form results in "0x048a0248". In the case of idx=2, the values e0 to e9 are "2", "0", "0", "0", "0", "0", "0", "0", "0" and "0", respectively. Accordingly, the value val of the decision information setting instruction SET is the value shown in FIG. 5 in binary form. Conversion of this value into 32-bit immediate value expressed in hexadecimal form results in "0x00000002". In this case, the decision information setting instruction SET can be represented by the following statement. Statement representing the decision information setting instruction SET:

setfusion 0, 0x00512050
setfusion 1, 0x048a0248
setfusion 2, 0x00000002

As described above, by giving the decision information setting instruction SET to the decision unit 40, the values in the decision table 41 can be set specifically.

Second Embodiment

Figure 7:
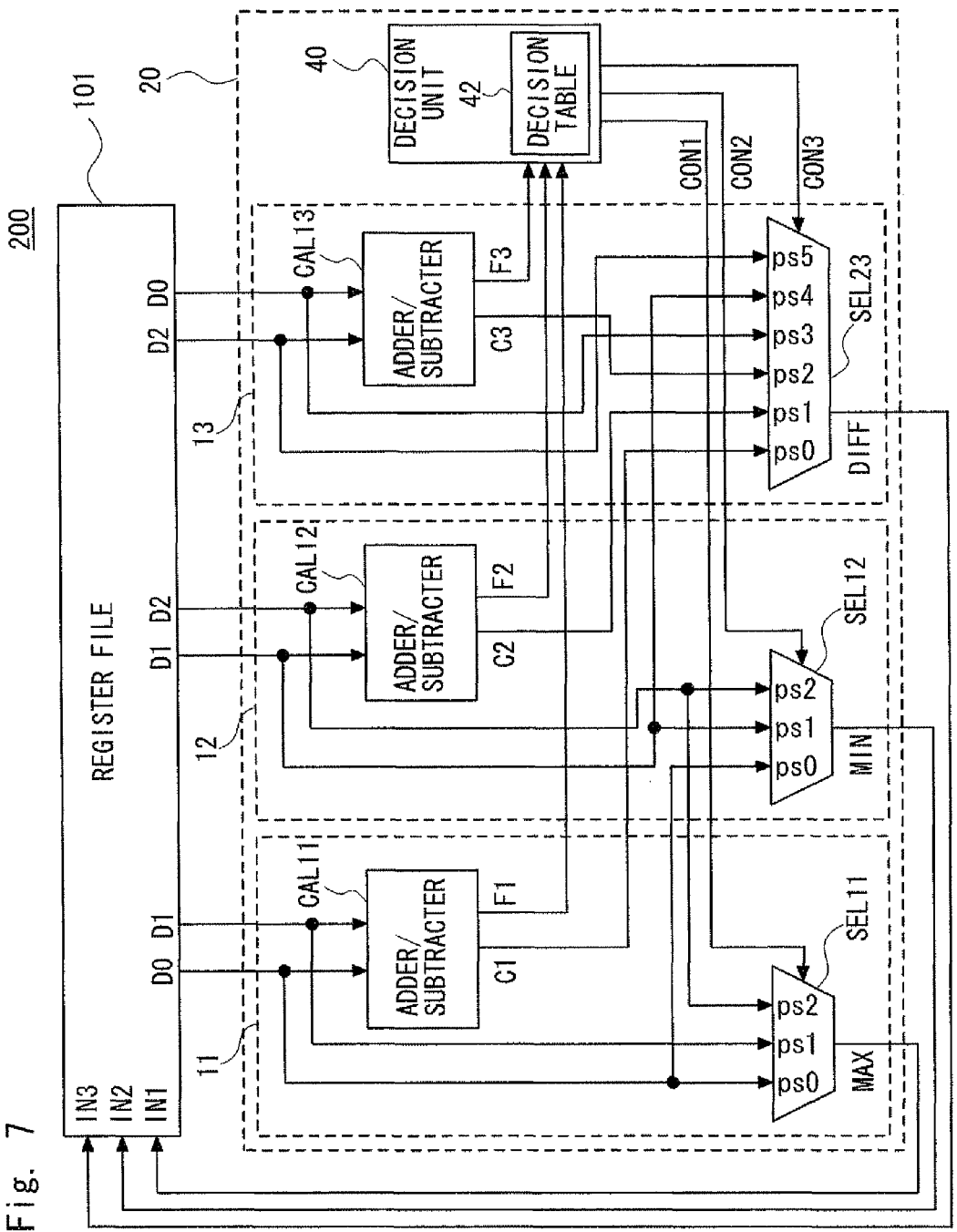
FIG. 7 is a block diagram schematically showing a configuration of an arithmetic apparatus 200 according to a second embodiment.

An arithmetic apparatus 200 according to a second embodiment is described hereinbelow. The arithmetic apparatus 200 is an apparatus capable of performing sorting of three data D0 to D2 in addition to the HSV conversion performed in the arithmetic apparatus 100 according to the first embodiment. FIG. 7 is a block diagram schematically showing a configuration of the arithmetic apparatus 200 according to the second embodiment. The arithmetic apparatus 200 is an example of the transformation of the configuration of the arithmetic apparatus 100 according to the first embodiment, and the configuration of the arithmetic circuit differs specifically. The arithmetic apparatus 200 includes a register file 101 and an arithmetic circuit 20. The register file 101 is the same as that of the first embodiment and thus not redundantly described.

The arithmetic circuit 20 includes slots 11, 12 and 23, and a decision unit 40. In the slot 11, an adder/subtracter CAL11 outputs a computation result C1 to a selector SEL23. The other configuration of the slot 11 is the same as that of the first embodiment and thus not redundantly described. In the slot 12, an adder/subtracter CAL12 outputs a computation result C2 to the selector SEL23. The other configuration of the slot 12 is the same as that of the first embodiment and thus not redundantly described. Further, the decision unit 40 is the same as that of the arithmetic circuit 10 and thus not redundantly described.

The slot 23 includes an adder/subtracter CAL13 and the selector SEL23. The selector SEL23 is a 6-input 1-output selector, which corresponds to a third selection circuit. The adder/subtracter CAL13 outputs a computation result C3 to the selector SEL23. The computation results C1 to C3 of the adders/subtracters CAL11 to CAL13 are respectively input to input ports ps0 to ps2 of the selector SEL23, and the data D0 to D2 are respectively input to input ports ps3 to ps5 of the selector SEL23. The selector SEL23 then outputs any of the data D0 to D2 as an intermediate value MID to the port IN3 of the register file 101 based on a control signal CON3 from the decision unit 40. The other configuration of the slot 23 is the same as that of the slot 13 and thus not redundantly described.

An operation of the arithmetic apparatus 200 is described hereinbelow. The HSV conversion in the arithmetic apparatus 200 is the same as that of the arithmetic apparatus 100 according to the first embodiment and not redundantly described, and sorting is described hereinbelow. The arithmetic apparatus 200 is capable of switching between the HSV conversion and the sorting by changing the set values of the decision table by the decision information setting instruction SET that is input to the decision unit 40 from the external control circuit 102. The sorting is specifically described hereinafter.

In the slot 11, the adder/subtracter CAL11 subtracts the value of the data D1 from the value of the data D0 and outputs the subtraction result as the computation result C1, as in the case of the HSV conversion. Further, the adder/subtracter CAL11 outputs the sign flag F1 according to the subtraction result. Specifically, when the sign of the computation result C1 is negative, i.e. D0<D1, the adder/subtracter CAL11 outputs "1" as the sign flag F1. On the other hand, when the sign of the computation result C1 is not negative, i.e. D0≥D1, the adder/subtracter CAL11 outputs "0" as the sign flag F1.

Likewise, in the slot 12, the adder/subtracter CAL12 subtracts the value of the data D2 from the value of the data D1 and outputs the subtraction result as the computation result C2, as in the case of the HSV conversion. Further, the adder/subtracter CAL12 outputs the sign flag F2 according to the subtraction result. Specifically, when the sign of the computation result C2 is negative, i.e. D1<D2, the adder/subtracter CAL12 outputs "1" as the sign flag F2. On the other hand, when the sign of the computation result C2 is not negative, i.e. D1≥D2, the adder/subtracter CAL12 outputs "0" as the sign flag F2.

Likewise, in the slot 23, the adder/subtracter CAL13 subtracts the value of the data D0 from the value of the data D2 and outputs the subtraction result as the computation result C3, as in the case of the HSV conversion. Further, the adder/subtracter CAL13 outputs the sign flag F3 according to the subtraction result. Specifically, when the sign of the computation result C3 is negative, i.e. D2<D0, the adder/subtracter CAL13 outputs "1" as the sign flag F3. On the other hand, when the sign of the computation result C3 is not negative, i.e. the adder/subtracter CAL13 outputs "0" as the sign flag F3.

Figure 8:
FIG. 8 is a diagram showing a decision table 42 for sorting stored in the decision unit 40.

The decision unit 40 determines a magnitude relation among the data D0 to D2 according to the sign flags F1 to F3. The decision unit 40 then outputs the control signals CON1 to CON3 on the basis of the magnitude relation of the data D0 to D2. FIG. 8 is a diagram showing a decision table 42 for the sorting that is stored in the decision unit 40. Note that the decision table 42 corresponds to a second decision table.

For example, when the sign flags F1 to F3 are "0", "0" and "1", respectively, the propositions "D0<D1" and "D1<D2" are false, and the proposition "D2<D0" is true. In this case, the magnitude relation "D0≥D1≥D2" is established for the data D0 to D2. In this case, the decision unit 40 outputs "0", "2" and "4" as the control signals CON1 to CON3, respectively. Each of the selectors SEL11 and SEL12 selects any one of the input ports ps0 to ps2 according to the control signals CON1 and CON2. The selector SEL23 selects any of the input ports ps0 to ps5 according to the control signal CON3. Specifically, when the value of the control signals CON1 and CON2 is k (k is an integer of 0 to 2), each of the selectors SEL11 and SEL12 selects an input port psk. When the value of the control signal CON3 is j (j is an integer of 0 to 5), the selector SEL23 selects an input port psj.

The selector SEL11 selects the data D0 that is input to the input port ps0 according to the value "0" of the control signal CON1, as in the case of the HSV conversion. The data D0 is thereby specified as the maximum value MAX. Thus, the selector SEL11 functions as a maximum value selector. Then, the selector SEL11 outputs the data D0, which is the maximum value MAX, to the port IN1 of the register file 101. Accordingly, the port IN1 of the register file 101 always receives the maximum value MAX.

The selector SEL12 selects the data D2 that is input to the input port ps2 according to the value "2" of the control signal CON2, as in the case of the HSV conversion. The data D2 is thereby specified as the minimum value MIN. Thus, the selector SEL12 functions as a minimum value selector. Then, the selector SEL12 outputs the data D2, which is the minimum value MIN, to the port IN2 of the register file 101. Accordingly, the port IN2 of the register file 101 always receives the minimum value MIN.

The selector SEL23 selects the data D1 that is input to the input port ps4 according to the value "4" of the control signal CON5. The data D1 is thereby specified as the intermediate value MID. Thus, the selector SEL23 functions as an intermediate value selector. Then, the selector SEL23 outputs the data D1, which is the intermediate value MID, to the port IN3 of the register file 101. Accordingly, the port IN3 of the register file 101 always receives the intermediate value MID.

Although the case where the sign flags F1 to F3 are "0", "0" and "1", respectively, is described above by way of illustration, the selectors SEL11, SEL12 and SEL23 output the maximum value MAX, the minimum value MIN and the intermediate value MID, respectively, when the sign flags F1 to F3 are other values as a matter of course.

Figure 9:
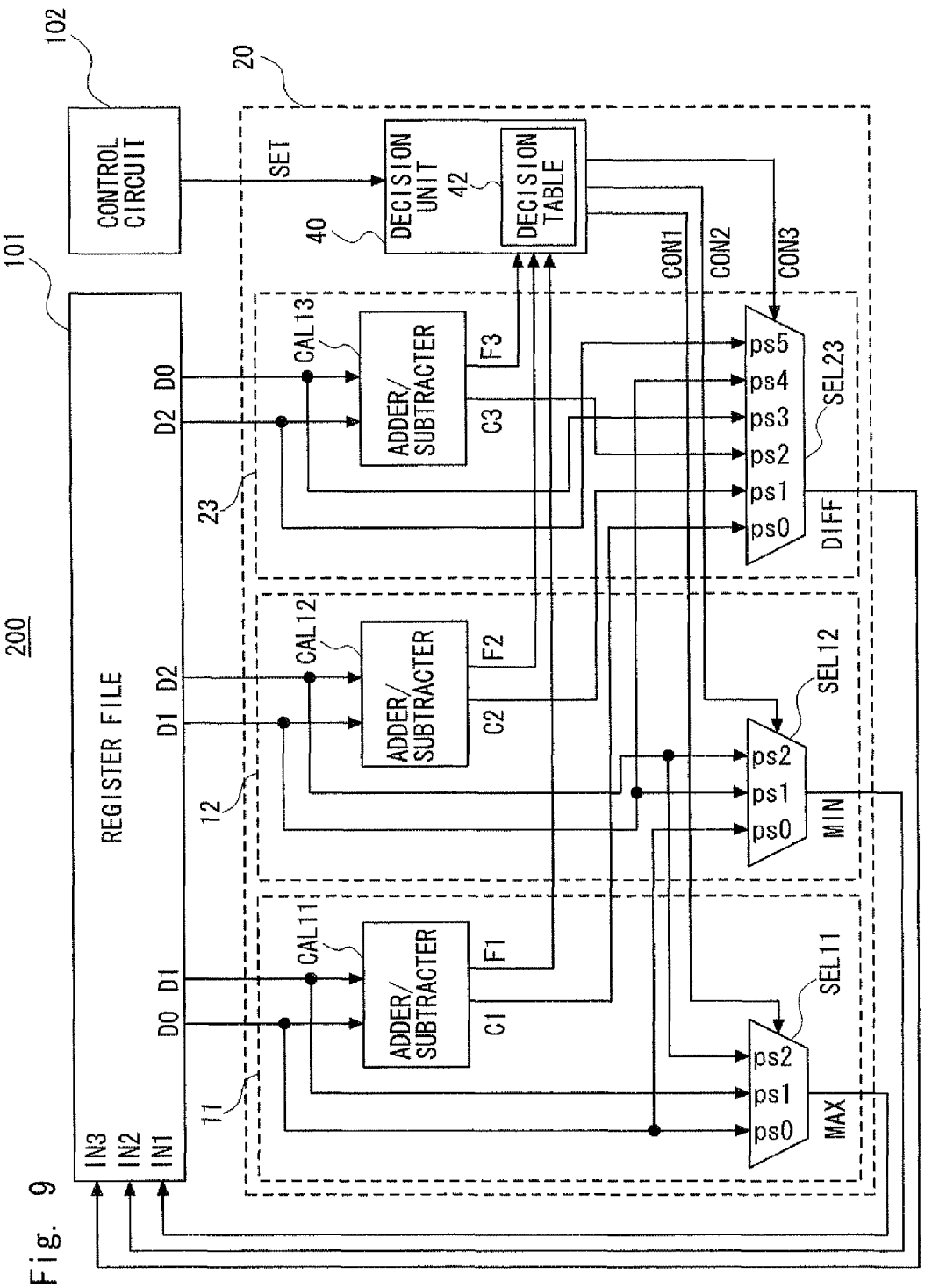
FIG. 9 is a block diagram schematically showing a configuration of the arithmetic apparatus 200 when setting the decision table 42 externally.

A method of setting the decision table 42 for sorting is described hereinafter. FIG. 9 is a block diagram schematically showing a configuration of the arithmetic apparatus 200 when setting the decision table 42 externally. In the arithmetic apparatus 200, the decision table 41 can be replaced with the decision table 42 by the decision information setting instruction SET in the following procedure. Note that the decision table 42 can be replaced with the decision table 41 in the same procedure as a matter of course.

Figure 10:
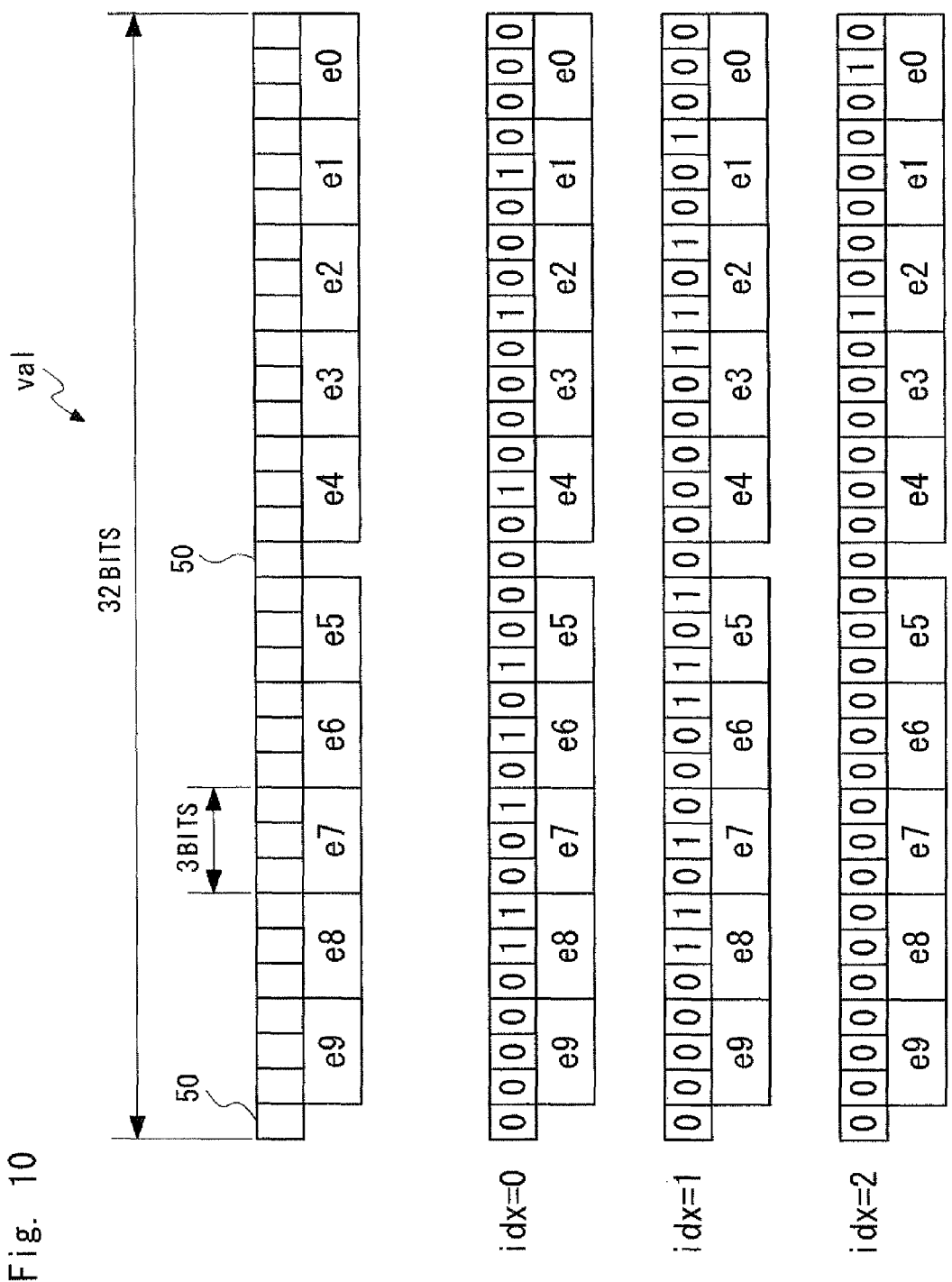
FIG. 10 is a diagram showing a structure example of the value val of the decision information setting instruction SET according to the second embodiment.

The decision information setting instruction SET is given to the decision unit 40 from a control circuit 102 outside the arithmetic apparatus 200. The set values of the decision table 42 are the same as those of the decision table 41 described earlier with reference to FIG. 4 and thus not redundantly described. Further, the structure of the value val of the decision information setting instruction SET is described earlier with reference to FIG. 5 and thus not redundantly described. The relation between the value val of the decision information setting instruction SET and the set values of the decision table 42 is also described earlier with reference to FIG. 6 and thus not redundantly described. Hereinafter, the case of setting the values shown in FIG. 8 as the control signals CON1 to CON3 is discussed, for example. FIG. 10 is a diagram showing a structure example of the value val of the decision information setting instruction SET according to the second embodiment.

First, in the case of idx=0, the values e0 to e9 are "0", "2", "4", "0", "2", "4", "2", "1", "3" and "0", respectively. Accordingly, the value val of the decision information setting instruction SET is the value shown in FIG. 10 in binary form. Conversion of this value into 32-bit immediate value expressed in hexadecimal form results in "0x06542110". In the case of idx=1, the values e0 to e9 are "0", "1", "5", "1", "0", "5", "1", "2", "3" and "0", respectively. Accordingly, the value val of the decision information setting instruction SET is the value shown in FIG. 10 in binary form. Conversion of this value into 32-bit immediate value expressed in hexadecimal form results in "0x068d0348". In the case of idx=2, the values e0 to e9 are "2", "0", "4", "0", "0", "0", "0", "0", "0" and "0", respectively. Accordingly, the value val of the decision information setting instruction SET is the value shown in FIG. 10 in binary form. Conversion of this value into 32-bit immediate value expressed in hexadecimal form results in "0x00000102". In this case, the decision information setting instruction SET can be represented by the following statement. Statement representing the decision information setting instruction SET:

setfusion 0, 0x06542110
setfusion 1, 0x068d0348
setfusion 2, 0x00000102

As described above, the arithmetic circuit 20 detects the maximum value MAX, the minimum value MIN and the intermediate value MID on the basis of the decision result of the decision unit 40. Then, the arithmetic circuit 20 can output the maximum value MAX, the minimum value MIN and the intermediate value MID to the corresponding ports IN1 to IN3 of the register file 101. Thus, the arithmetic circuit 20 can determine the magnitude relation of the data D0 to D2 read from the register file 101 and sort the values, in addition to performing the HSV conversion. In other words, the arithmetic circuit 20 can perform computations that requires conditional branch to compare three or more values and specify the maximum value, the minimum value and the like of the values, which is the sorting specifically, in one cycle. Consequently, in this configuration, it is possible to achieve the arithmetic circuit and the arithmetic apparatus that can perform comparison involving conditional branch of three or more values at high speed. Further, because the sorting is possible, it is possible to provide the arithmetic apparatus 200 and the arithmetic circuit 20 that are more sophisticated and versatile than the arithmetic apparatus 100 and the arithmetic circuit 10.

Further, the arithmetic circuit 20 can calculate the maximum value MAX, the minimum value MIN and the intermediate value MID in one cycle without temporarily storing the intermediate computation result into the register file 101 after reading data from the register file 101. The arithmetic circuit 20 can thereby perform the sorting at high speed.

Third Embodiment

Figure 11:
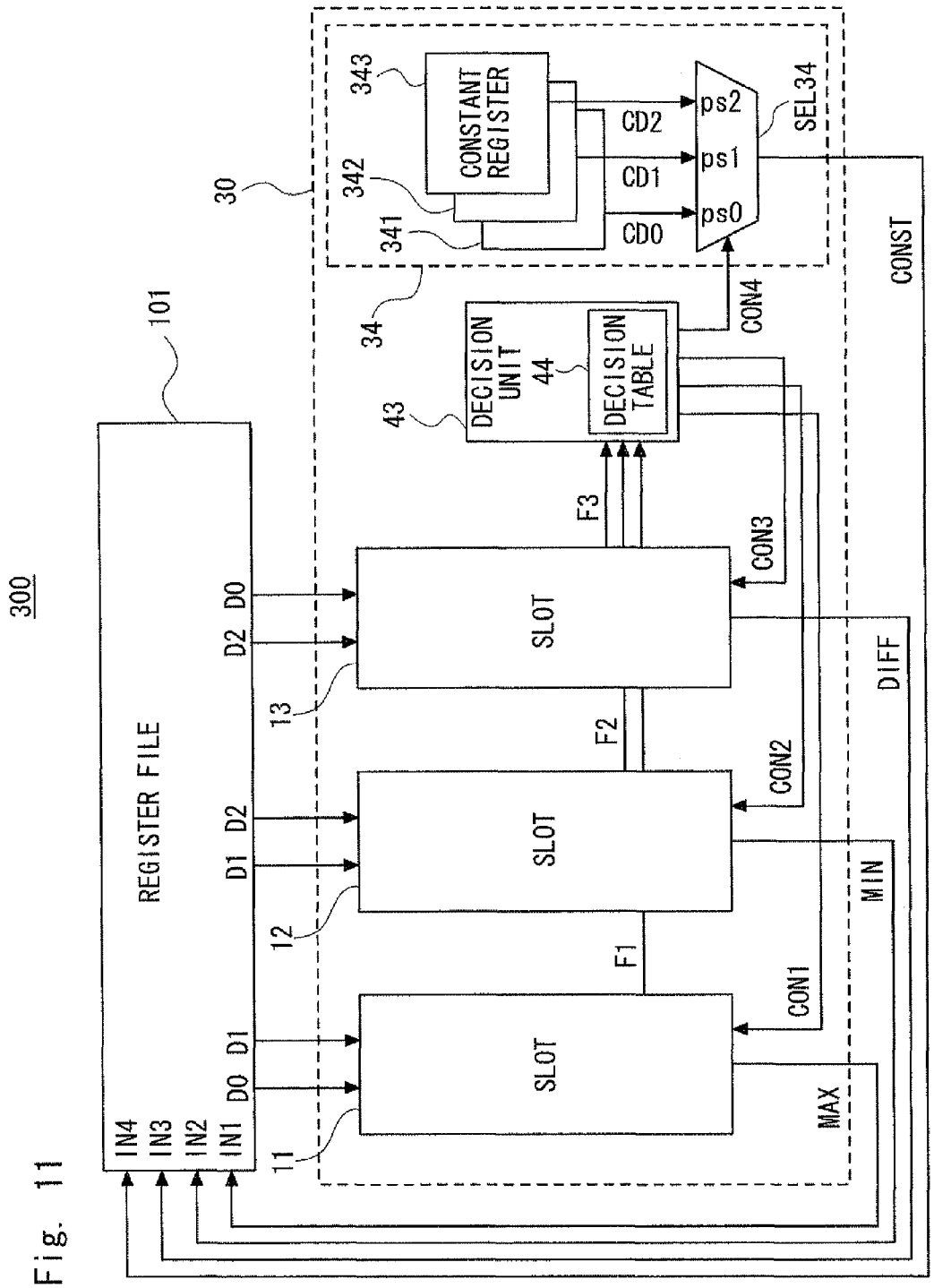
FIG. 11 is a block diagram schematically showing a configuration of an arithmetic apparatus 300 according to a third embodiment.

An arithmetic apparatus 300 according to a third embodiment is described hereinbelow. The arithmetic apparatus 300 is an apparatus capable of specifying constants that are used for the conversion from the RGB color space to the HSV color space at the same time in addition to the HSV conversion performed in the arithmetic apparatus 100 according to the first embodiment. FIG. 11 is a block diagram schematically showing a configuration of the arithmetic apparatus 300 according to the third embodiment. The arithmetic apparatus 300 is an example of the transformation of the configuration of the arithmetic apparatus 100 according to the first embodiment, and the configuration of the arithmetic circuit differs specifically. The arithmetic apparatus 300 includes a register file 101 and an arithmetic circuit 30. The register file 101 is the same as that of the first embodiment except that a port IN4 is added, and thus not redundantly described. The arithmetic circuit 30 includes slots 11 to 13 and 34, and a decision unit 43. The slots 11 to 13 are the same as those of the arithmetic circuit 10 and thus not redundantly described.

The slot 34 includes constant registers 341 to 343 and a selector SEL34. The selector SEL34 is a 3-input 1-output selector, which corresponds to a fourth selection circuit. Constant data CD0 to CD2 are respectively input to input ports ps0 to ps2 of the selector SEL34 from the constant registers 341 to 343. The selector SEL34 then outputs any of the constant data CD0 to CD2 as a constant CONST to the port IN4 of the register file 101 based on a control signal CON4 from the decision unit 43.

The decision unit 43 outputs the control signals CON1 to CON3 to the selectors SEL11 to SEL13, respectively, and outputs the control signal CON4 to the selector SEL34 of the slot 34 by reference to a stored decision table 44 on the basis of the sign flags F1 to F3. Note that the decision table 44 corresponds to a third decision table.

An operation of the arithmetic apparatus 300 is described hereinbelow. The HSV conversion that calculates the maximum value MAX, the minimum value MIN and the difference DIFF in the arithmetic apparatus 300 is the same as that of the arithmetic apparatus 100 according to the first embodiment and thus not redundantly described. Therefore, a calculation method of the constant CONST is described hereinafter.

Replacement of the data D0 to D2 with R, G and B in the RGB color space allows the arithmetic apparatus 300 to calculate not only MAX, MIN and difference DIFF in the above-described equations (1) to (5) but also the values of the constants in the above-described equations (1) to (3). The constant indicates a value in the second term of the right hand side of the equations (1) to (3), which is "0" in the equation (1), "120" in the equation (2), and "240" in the equation (3).

The decision unit 43 determines a magnitude relation among the data D0 to D2 according to the sign flags F1 to F3. The decision unit 43 then outputs the control signals CON1 to CON4 on the basis of the magnitude relation of the data D0 to D2. FIG. 12 is a diagram showing a decision table 44 that is stored in the decision unit 43.

For example, when the sign flags F1 to F3 are "0", "0" and "1", respectively, the propositions "D0<D1" and "D1<D2" are false, and the proposition "D2<D0" is true. In this case, the magnitude relation "D1≥D1≥D2" is established for the data D0 to D2. In this case, the decision unit 43 outputs "0", "2", "1" and "0" as the control signals CON1 to CON4, respectively.

The selector SEL34 selects any of the input ports ps0 to ps2 according to the control signal CON4. Specifically, when the value of the control signal CON4 is k (k is an integer of 0 to 2), the selector SEL34 selects an input port psk. Because the control signal CON4 is "0" as described above, the selector SEL34 selects the input port ps0. The selector SEL34 outputs the constant data CD0 as the constant CONST.

Regarding that the data D0 to D2 respectively correspond to R, G and B in the RGB color space, the values of the constant data CD0 to CD2 are "0", "120" and "240", respectively. In the above example, because the data D0 is the maximum, calculation using the equation (1) is performed. Accordingly, the selector SEL34 selects the constant data CD0 indicating the constant part of the equation (1) as the constant CONST. In the same manner, when G or B, which is the data D1 or D2, is the maximum, the appropriate constant can be calculated as a result that the decision unit 43 makes decision using the decision table 44.

It is noted that, in the case of performing the HSV conversion and the constant calculation using the arithmetic apparatus 300, an instruction given to the arithmetic apparatus 300 is represented by the following statement using C language, for example.

Statement representing the HSV conversion and the constant computation:

vmax=(d0>d1)?((d0>d2)?d0:d2):((d1>d2)?d1:d2);
vmin=(d0<d1)?((d0<d2)?d0:d2):((d1<d2)?d1:d2);
if (vmax==d0){
vdiff=d1−d2;
vconst=0;
}else if (vmax==d1){
Vdiff=d2−d0;
vconst=120;
}else{
Vdiff=d0−d1;
vconst=240;
H = (vdiff*60)/(vmax−vmin)+vconst In the above statement, vmax corresponds to the maximum value MAX, vmin corresponds to the minimum value MIN, vdiff corresponds to the difference DIFF, const corresponds to the constant CONST, and d0 to d2 correspond to data D0 to D2, respectively. In the first statement, calculate the maximum value vmax of d0 to d2 using a conditional operator. In the second statement, calculate the minimum value vmin of d0 to d2 using a conditional operator. In the third and subsequent statements, calculate the difference vdiff depending on which of d0 to d2 is the maximum value using if statement and specify the values of the constants in the equations (1) to (3).

Other Embodiments

It is noted that the present invention is not restricted to the above-described embodiments, and various changes and modifications may be made without departing from the scope of the invention. For example, although the case of performing sorting of the data D0 to D2 is described in the second embodiment, a configuration in which the computation results C1 to C3 are input to three registers to perform sorting of the computation results C1 to C3 may be employed.

Although the control circuit 102 is disposed inside the arithmetic apparatus 100 or 200 in FIGS. 3 and 9, it may be disposed outside the arithmetic apparatus 100 or 200.

Although the decision table 41 is rewritten by the decision information setting instruction SET in the second embodiment, this is by way of illustration. For example, a decision table for the HSV conversion and a decision table for the sorting may be prestored in the decision unit 40, and the decision table to be used may be designated by a selection signal from the control circuit.

The structure of the decision information setting instruction SET in the above-described embodiments is merely by way of illustration. Thus, the values e0 to e9 in the value val of the decision information setting instruction SET may be arranged in a different order. Further, the positions of free bits may be at other positions. Furthermore, the correspondence between the set values of the decision table and the values e0 to e9 may be another one. Note that, although the value val of the decision information setting instruction SET is expressed in hexadecimal form, it may be expressed in another form.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An arithmetic circuit comprising:
a plurality of computing units configured to perform arithmetic computations on input data and to output flag information generated based on a result of the computations;
a plurality of selection circuits configured to select any one of the data input to the plurality of computing units; and
a decision unit configured to receive the flag information from the plurality of computing units and to control select operation of each of the plurality of selection circuits,
wherein the decision unit is configured to decide a magnitude relation of the data input to the plurality of computing units by checking the flag information against a stored decision table, and to control select operation of each of the plurality of selection circuits based on a decision result.

2. An arithmetic apparatus comprising the arithmetic circuit according to claim 1.

3. The arithmetic apparatus according to claim 2, further comprising:
a register file configured to output the data to the plurality of computing units and to receive outputs from the plurality of selection circuits.

4. An arithmetic circuit comprising:
a plurality of computing units configured to perform arithmetic computations on input data and to out put flag information generated based on a result of the computations;
a plurality of selection circuits configured to select any one of the data input to the plurality of computing units; and
a decision unit configured to receive the flag information from the plurality of computing units and to control select operation of each of the plurality of selection circuits,
wherein the decision unit is configured to cause any one of the plurality of selection circuits to select a maximum value or a minimum value of the data input to the plurality of computing units.

5. The arithmetic circuit according to claim 4, wherein each of the plurality of computing units is configured to output a sign flag indicating a sign of a value obtained by subtracting one of two data from another one as the flag information.

6. The arithmetic circuit according to claim 4, wherein
the plurality of computing units include a first computing unit configured to receive first data and second data, a second computing unit configured to receive the second data and third data, and a third computing unit configured to receive the third data and the first data, and
the plurality of selection circuits include first to third selection circuits configured to receive the first to third data.

7. The arithmetic circuit according to claim 6, wherein
the first computing unit is configured to output a first sign flag indicating a sign of a first computation result obtained by subtracting the second data from the first data,
the second computing unit is configured to output a second sign flag indicating a sign of a second computation result obtained by subtracting the third data from the second data, and
the third computing unit is configured to output a third sign flag indicating a sign of a third computation result obtained by subtracting the first data from the third data.

8. The arithmetic circuit according to claim 7, wherein the decision unit is configured to decide a magnitude relation of the first to third data by checking the first to third sign flags against a stored first decision table, and to cause the first selection circuit to select a maximum value of the first to third data and to cause the second selection circuit to select a minimum value of the first to third data based on a decision result.

9. The arithmetic circuit according to claim 8, wherein
the first to third computing units further are configured to output the first to third computation results, respectively,
the third selection circuit further is configured to receive the first to third computation results, and
the decision unit is configured to cause the third selection circuit to select the computation result output from one of the first to third computing units not receiving the maximum value of the first to third data based on the decision result.

10. The arithmetic circuit according to claim 7, wherein the decision unit is configured to decide a magnitude relation of the first to third data by checking the first to third sign flags against a stored second decision table different from the first decision table, and to cause the first selection circuit to select a maximum value of the first to third data, to cause the second selection circuit to select a minimum value of the first to third data, and to cause the third selection circuit to select a value different from the maximum value and the minimum value of the first to third data based on a decision result.

11. The arithmetic circuit according to claim 10, wherein one of the first decision table and the second decision table is alternately set to the decision unit by a signal from outside the decision unit.

12. The arithmetic circuit according to claim 7, further comprising:
first to third registers that store constants corresponding to the first to third data, respectively, wherein
the plurality of selection circuits further include a fourth selection circuit configured to select any one of the constants stored in the first to third registers, and
the decision unit is configured to decide a magnitude relation of the first to third data by checking the first to third sign flags against a stored third decision table different from the first decision table, and to cause the first selection circuit to select a maximum value of the first to third data, to cause the second selection circuit to select a minimum value of the first to third data, to cause the third selection circuit to select the computation result output from one of the first to third computing units not receiving the maximum value of the first to third data, and to cause the fourth selection circuit to select one of the constants stored in the first to third registers corresponding to any one of the first to third data being the maximum value.

13. The arithmetic circuit according to claim 6, wherein the first to third data are values of R, G and B in RGB color space.

14. An arithmetic apparatus comprising the arithmetic circuit according to claim 4.

15. The arithmetic apparatus according to claim 14, further comprising:
a register file configured to output the data to the plurality of computing units and to receive outputs from the plurality of selection circuits.

* * * * *